United States Patent [19]
Yokoi et al.

[11] Patent Number: 5,820,462
[45] Date of Patent: *Oct. 13, 1998

[54] MANIPULATOR FOR GAME MACHINE

[75] Inventors: Gunpei Yokoi; Kenichi Sugino, both of Kyoto, Japan

[73] Assignee: Nintendo Company Ltd., Kyoto, Japan

[ * ] Notice: The term of this patent shall not extend beyond the expiration date of Pat. No. Des. 375,326.

[21] Appl. No.: 509,605

[22] Filed: Jul. 31, 1995

Related U.S. Application Data

[63] Continuation-in-part of Ser. No. 30,441, Oct. 31, 1994, Pat. No. Des. 375,326.

[30] Foreign Application Priority Data

Aug. 2, 1994 [JP] Japan .................................. 6-201465

[51] Int. Cl.⁶ ...................................................... A63F 9/22
[52] U.S. Cl. ......................... 463/37; 345/169; 273/148 B
[58] Field of Search ......................... 273/148 B; 463/37, 463/38, 47; 345/156, 161; 434/29, 37; D21/48

[56] References Cited

U.S. PATENT DOCUMENTS

| | | | |
|---|---|---|---|
| D. 316,879 | 5/1991 | Shulman et al. ........................ | D21/48 |
| D. 317,946 | 7/1991 | Tse .......................................... | D21/48 |
| D. 357,712 | 4/1995 | Wu .......................................... | D21/48 |
| D. 363,092 | 10/1995 | Hung ...................................... | D21/48 |
| D. 375,326 | 11/1996 | Yokoi et al. ............................. | D21/48 |
| 4,281,833 | 8/1981 | Sandler et al. . | |
| 4,359,222 | 11/1982 | Smith, III et al. . | |
| 4,659,313 | 4/1987 | Kuster et al. ........................... | 463/37 X |
| 4,817,149 | 3/1989 | Myers . | |
| 4,887,966 | 12/1989 | Gellerman ............................... | 463/38 |
| 4,924,216 | 5/1990 | Leung . | |
| 4,933,670 | 6/1990 | Wislocki . | |
| 4,976,429 | 12/1990 | Nagel . | |
| 5,012,230 | 4/1991 | Yasuda . | |
| 5,046,739 | 9/1991 | Reichow . | |

(List continued on next page.)

FOREIGN PATENT DOCUMENTS

| | | |
|---|---|---|
| 0 470 615 A1 | 2/1992 | European Pat. Off. . |
| 4-104893 | 9/1992 | Japan . |
| 6-54962 | 3/1994 | Japan ...................................... 273/438 |
| 2 244 546 | 12/1991 | United Kingdom . |
| WO 92/09347 | 6/1992 | WIPO . |
| WO 94/12999 | 6/1994 | WIPO . |

OTHER PUBLICATIONS

*Knuckles Chaotix Instruction Manual*, Sega, Redwood City, California, #84503 (1995).

*PilotWings Instruction Booklet*, Super Nintendo Entertainment System, SNS–PW–USA, copyright 1991.

*PilotWings, It's a Festival of Flight*, Top Secret Password Nintendo Player's Guide, pp. 82–83 and 160, copyright 1991.

*PilotWings, Soar with the Flight Club*, Super Nintendo Entertainment System Play's Guide, pp. 100–105, copyright 1991.

*Sega Genesis 32X, Instruction Manual*, Sega, Redwood City, CA, #672–2116 (1994).

*Sega Genesis Instruction Manual*, Sega, Hayward, California, #3701–926–0–01 (1994).

*Sonic 2 The Hedgehog Instruction Manual*, Sega, Hayward, California, #672–0944 3701–925–0–01 (1992).

Sony PlayStation Instruction Manual, and informational materials, Sony Computer Entertainment Inc. 1995.

*Primary Examiner*—Raleigh W. Chiu
*Attorney, Agent, or Firm*—Nixon & Vanderhye P.C.

[57] ABSTRACT

A manipulator includes a housing which consists of right and left handles, and a coupling for coupling the handles. Both handles are formed with grips and direction instructing switches for instructing the character moving direction. The direction instructing switches are disposed in the thumb position area of the player in the upper parts of the grips. A step is formed between the operating regions for the direction instructing switches and the grips, such that the thumb of the player draws a spontaneous arc along the step.

8 Claims, 5 Drawing Sheets

U.S. PATENT DOCUMENTS

| | | |
|---|---|---|
| 5,052,685 | 10/1991 | Lowe et al. . |
| 5,095,798 | 3/1992 | Okada et al. . |
| 5,203,563 | 4/1993 | Loper, III .............................. 273/148 B |
| 5,207,426 | 5/1993 | Inoue et al. . |
| 5,290,034 | 3/1994 | Hineman ................................ 463/38 |
| 5,436,640 | 7/1995 | Reeves ................................ 463/38 X |
| 5,515,044 | 5/1996 | Glatt . |
| 5,551,693 | 9/1996 | Goto et al. .............................. 463/37 |
| 5,563,629 | 10/1996 | Caprara . |

MANIPULATOR FOR GAME MACHINE

This application is a continuation-in-part of U.S. application Ser. No. 29/030,441 filed Oct. 31, 1994, now U.S. Pat. No. Des. 375,326

BACKGROUND OF THE INVENTION

1. Field of the Invention

The present invention relates to a manipulator for game machine, and more particularly to a manipulator for game machine which is used in a television game machine, a video game machine with display, or the like to which a cartridge storing a game program is detachably attached and which executes the process for the game by reading out the game program from the cartridge.

2. Description of the Prior Arts

Manipulators for game machine (game controllers) to be used in television game or the like known hitherto include the joy stick type as disclosed in the Japanese Laid-open patent No. 58-225,515 (corresponding to U.S. Pat. No. 4,414,438; hereinafter called prior art 1), and the joy pad type as disclosed in the Japanese Laid-open Utility Model No. 4-42,029 (corresponding to U.S. Pat. No. 5,207,426; hereinafter called prior art 2). In prior art 1, the main body housing is held by a non-dexterous hand, and a control rod (handle) is held by the dexterous hand, and by tilting the wrist in this state, the moving direction of the character is instructed. In prior art 2, on a flat housing that can be held by both hands, a plurality of operation switches for direction instruction and action instruction are arranged.

In prior art 1, in order to manipulate the control rod by tilting the wrist, the main body must be always held stably. However, for use in the game, it is necessary to manipulate action instructing switches for instructing various actions, and usually these switches are provided at the main body side, and are hence manipulated by the hand holding the main body. It is therefore difficult to hold the main body stably while manipulating the action instructing switches, and it was hard to manipulate. If the action instructing switches are provided in the control rod, since the direction is instructed by tilting the wrist, the hand is fatigued after a long use, and the controllability was poor.

In prior art 2, it is designed to be held by both hands, and the operation switches can be manipulating without changing the palm holding state, and the problems in prior art 1 were solved and stable manipulation was possible. However, since the shape is flat, it has few positions to be caught by hand or finger, and it often slips out of hands during operation, or the holding position may be deviated to cause deviation in the configuration of the switches and fingers, and misoperations are likely to occur, and it was necessary to hold the manipulator correctly on every occasion of misoperation by viewing, and correct the configuration of switches and fingers. As a result, a continuously running game was interrupted, and pleasant feel of manipulation was not obtained. In particular, when used in the game machine with a goggle type display unit, to correct the position deviation from fingers by viewing the manipulator, the game machine with display unit must be dismounted from the head, which was very bothersome.

In a controller disclosed in the Japanese Laid-open Utility Model No. 4-104,893 (hereinafter called prior art 3), since a grip is formed in the manipulator of prior art 2, it does not slip off during operation or the holding position will not be deviated. In prior art 3, however, since the manipulation plane on which operation switches are formed projects ahead (to the player side) of the grip, the player must use by warping the thumb (in other words, by keeping the thumb root always in tense state), the thumb is fatigued and cannot withstand a long use. Besides, since the root of the thumb is always in tense state, the moving range of the thumb is limited, and the feel of manipulation is not pleasant.

SUMMARY OF THE INVENTION

Therefore, a principal object of the present invention is to provide a novel manipulator for game machine.

Another object of the present invention is to provide a manipulator having a good operability.

A manipulator for game machine according to the present invention comprises a first grip selected in a bar shape to be held by a hand of the player, a second grip selected in a bar shape to be held by the other hand of the player, a first operating region located in the thumb area of the player in the upper portion of the first grip, formed in a step so as to be lower than the thumb root position of the player of the first grip, a second operating region located in the thumb area of the player in the upper portion of the second grip, formed in a step so as to be lower than the thumb root position of the player of the second grip, first direction instructing means provided in the first operating region, second direction instructing means provided in the second operating region, and coupling means for coupling the first grip and second grip in a confronting state.

The player holds the first grip by one hand, and holds the second grip by the other hand. In the grip holding state, the thumb of the player draws a spontaneous arc along the step formed between the grip and the operating region, and is positioned on the first and second operating regions.

According to the present invention, the player holds in the grip catching state, and hence can hold more securely as compared with the manipulator in a flat shape held by both palms. It is further structured to be caught easily by hand and fingers, and dropping of the manipulator during use or deviation of holding position are avoided, thereby allowing to continue to manipulate stably without having to look at the hands or change the holding position correctly, and misoperation due to deviation of configuration of switches and fingers can be prevented.

Moreover, between the grip and operating region, a step is formed so as to be lower than the thumb root position of the player in the grip, so that the thumb draws a spontaneous arc along the step. As a result, any excessive load is not applied to the thumb, and the fatigue is less if used for a long time.

Furthermore, according to a fourth aspect of the invention, the front, rear, left and right directions, and upper, lower, right slant and left slant directions can be instructed, so that directions can be instructed in a three-dimensional space.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
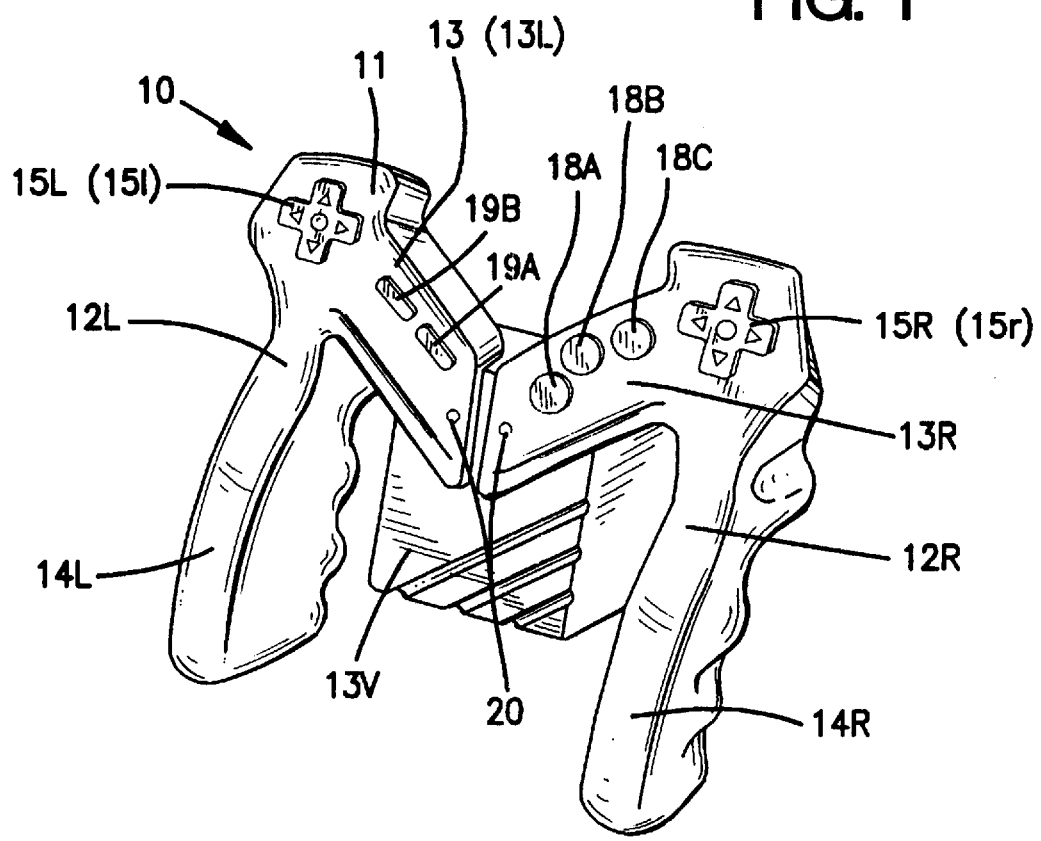
FIG. 1 is a front perspective view of a manipulator for game machine in an embodiment of the invention.
Figure 2:
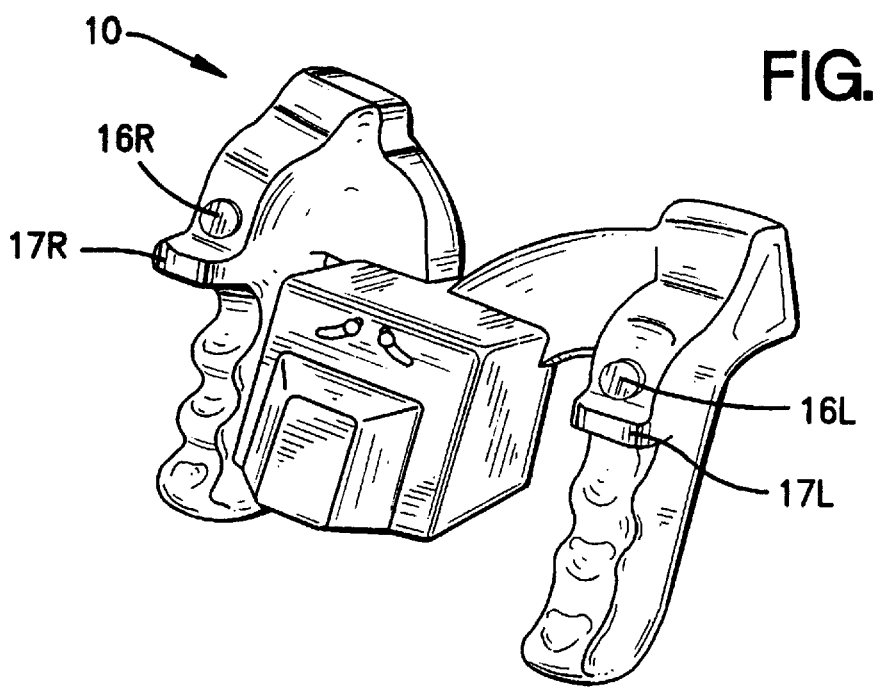
FIG. 2 is a rear perspective view of the embodiment in FIG. 1.

FIG. 1 and FIG. 2 are perspective views showing a manipulator for game machine in an embodiment of the invention, and specifically FIG. 1 is a perspective view from the front side, and FIG. 2 is a perspective view from the rear side.

In the diagrams, a manipulator for a game machine (hereinafter called controller) 10 contains a housing 11. The housing 11 is roughly composed of a right handle 12R, a left handle 12L, and a coupling 13 for coupling the handles. Inside the housing 11 is accommodated a board in a proper shape (not shown) in which desired conductive circuit patterns are formed by printed wiring or the like.

The right handle 12R and left handle 12L respectively comprise grips 14R, 14L to be held by the middle, ring and little fingers of the player, and a direction instructing switch for right hand 15R and a direction instructing switch for left hand 15L for instructing the moving direction of characters (hero and others) of the game are disposed in the thumb position area of the player in the upper portions of the grips 14R, 14L. The direction instructing switch for right hand 15R comprises, for example, a cross key top 15r capable of instructing four orthogonal directions, that is, front, rear, left and right directions shown in FIG. 3, and further comprises four pressing pads corresponding to the four directions. The direction instructing switch for left hand 15L comprises, for example, a cross key top 15l capable of instructing four directions, that is, upper, lower, right slant and left slant directions shown in FIG. 4, and further comprises four pressing pads corresponding to the four directions.

The grips 14R, 14L have concave and convex parts to be matched with the fingers of the player when held, and a more comfortable, pleasant grip is realized. In the index finger position areas of the player in the upper portions of the rear side of the grips 14R, 14L (in other words, the rear sides of the locations of the direction instructing switch for right hand 15R and direction instructing means for left hand 15L), action instructing switches 16R, 16L (see FIG. 2) are formed. These action instruction switches 16R, 16L differ with the game program, and are used for instructing actions of characters such as "run" and "jump" except for the moving direction. In the boundary areas of the action instructing switches 16R, 16L and grips 14R, 14L, protrusions 17R, 17L are formed, on which the index fingers can be placed when not manipulating the action instructing switches 16R, 16L. The protrusions 17R, 17L also function as guides for defining the moving direction of the index fingers at the time of manipulation.

The coupling 13 further comprises a power source unit 13V, a right coupling 13R for coupling the power source unit 13V and right handle 12R, and a left coupling 13L for coupling the power source unit 13V and left handle 12L. A dry cell or a battery is placed in the power source unit 13V, and when a dry cell is used, a battery lid is formed at a proper position. When a rechargeable battery is used, an external input terminal for connecting with a commercial AC power source detachably or firmly with a cord or the like is exposed at a position not disturbing the manipulation of the player (for example, in the bottom of the power source unit 13V), and is covered with a lid or the like if necessary. The power source unit 13V may be also configured to accomod both a dry cell and a battery.

The AC adapter for converting the commercial AC power source into DC may be either provided externally by using a cord, or incorporated in the power source unit 13V. When it is configured to supply current through a cord by externally attaching an AC adapter, the overall weight of the controller 10 can be reduced, and hence arm fatigue in long use can be alleviated. In the alternative, when the controller 10 is used on a table or the like such that the weight may be ignored, the overall weight of the controller 10 may be increased by incorporating the AC adapter, and hence the center of gravity is stabilized to prevent shaking during manipulation to provide a stable feel of manipulation.

In the right coupling 13R, switches 18A, 18B, 18C are formed so as to instruct three actions, different from those of the action instructing switches 16R, 16L, such as "punch," "kick" and "throw." In the left coupling 13L, a start switch 19A for instructing to start the game, and a select switch 19B for selecting the games are formed.

In this embodiment, in order that the switches 18A, 18B, 18C, 19A, and 19B may be arranged within the accessible range of a user's thumbs, the coupling 13 is coupled near the upper end of the handle 12 in which the direction instructing switch 15 is formed, but as far as the switches 18A, 18B, 18C, 19A, and 19B may be arranged within a user's accessible range of the thumbs, it is not always necessary to couple the coupling 13 near the upper end of the handle 12. Otherwise, when the operating region for forming the direction instructing switch 15 is wide and the switches 18A, 18B, 18C, 19A, and 19B are arranged in this area, the coupling position of the coupling 13 with the handle 12 is not particularly limited.

The direction instructing switch for right hand 15R and direction instructing switch for left hand 15L comprise cross key tops 15r, 15l as mentioned above. The direction instructing switches including these key tops 15r, 15l are disclosed, for example, in Japanese Utility Model Publication No. 3-13,951 (U.S. Pat. No. 4,687,200). That is, in the lower parts of the key tops 15r, 15l, rubber contacts (not shown) forming four contacts are respectively arranged, and each rubber contact is composed on a board (not shown) in which contact circuits are formed. By pressing any one of a total of eight pressing pads of the key tops 15r and 15l, the four contacts each or eight contacts in all and the contact circuits are electrically connected, and a signal instructing any one or combined direction of eight directions of front, rear, left, right, upper, lower, right slant and left slant directions is picked up, thereby acting as a switch for instructing a three-dimensional direction. The key tops 15r, 15l are put in the housing 11 with the pressing pads exposed, and the board is placed near the bottom of the key tops 15r, 15l in the housing 11.

Figure 3:
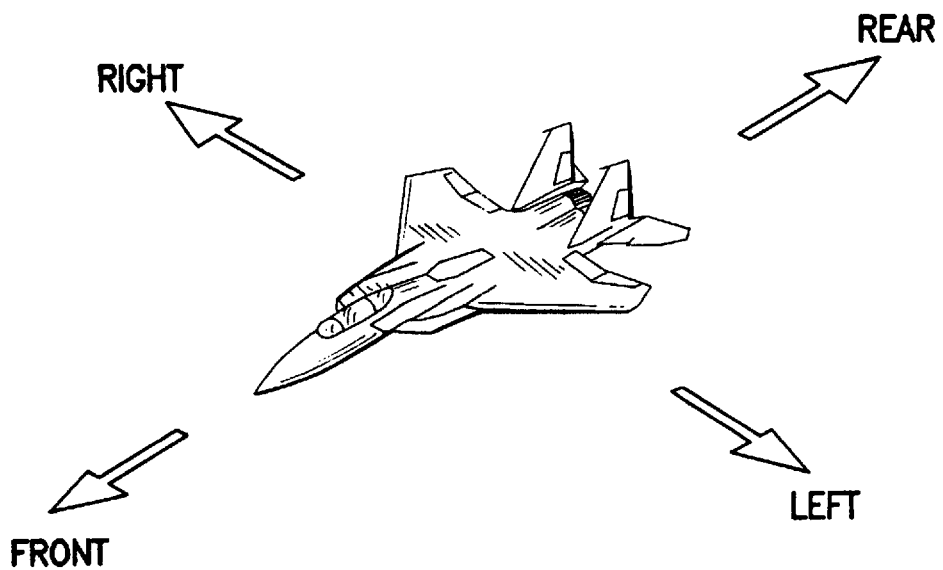
FIG. 3 is a concept diagram showing four moving directions, front, rear, left and right.
Figure 4:
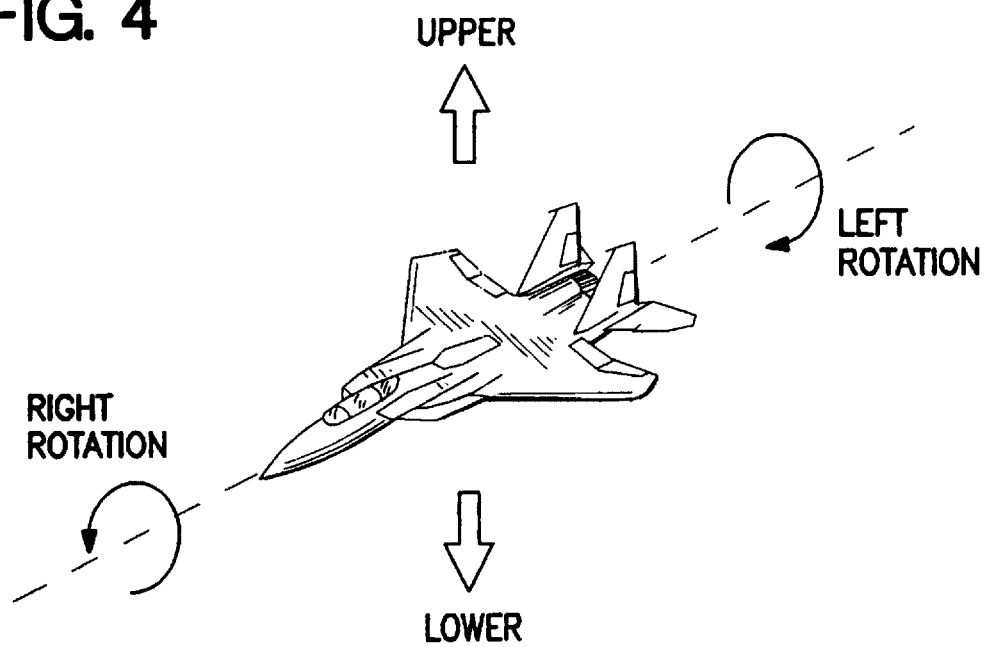
FIG. 4 is a concept diagram showing four moving directions, up, down, right slant and left slant.

Incidentally, if the character manipulated by the controller 10 of the invention is an airplane as shown in FIGS. 3 and 4, its three-dimensional move instructing direction consists of eight directions as mentioned above, but depending on the character in question, the three-dimensional move instructing direction is composed of different combinations, and the combinations are controlled by the game program. The three-dimensional move instructing directions aside from those mentioned above may include, for example in a human character, eight directions, front, rear, left, right, jump, squat, face right, and face left.

The switches 16R, 16L, 18A, 18B, 18C, 19A, 19B are respectively composed of key tops 16r, 16l, 18a, 18b, 18c, 19a, 19b stored with their pressing pads exposed from the housing 11, rubber contacts (not shown) disposed in the lower part of each key top, and a board (not shown) on which rubber contacts are placed and contact circuits are formed.

Figure 5:
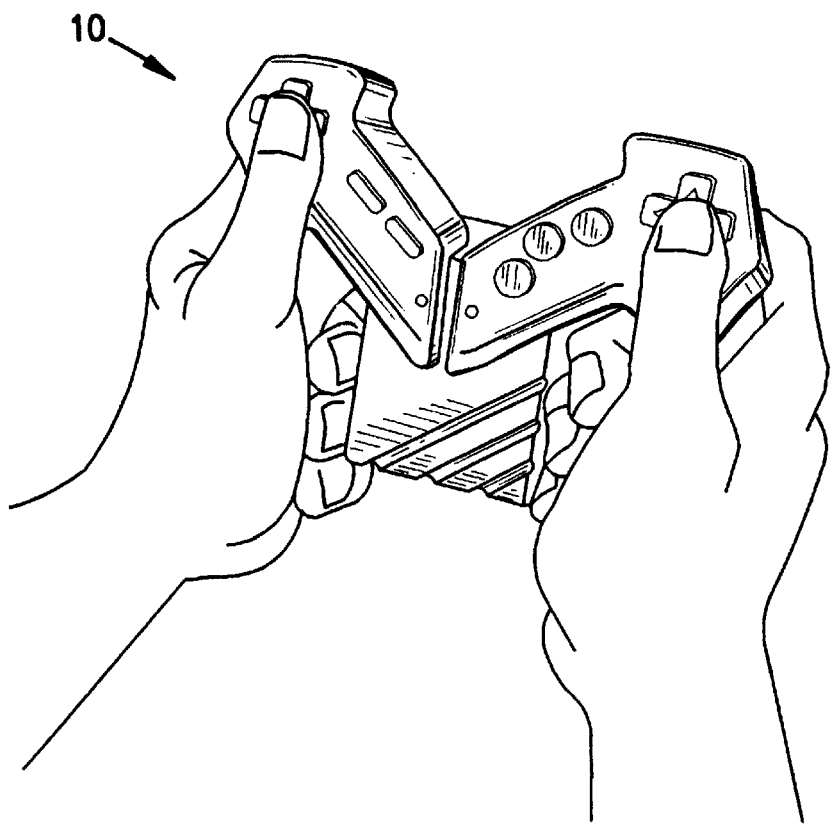
FIG. 5 is a perspective view showing an operation state as seen from the front side in FIG. 1.
Figure 6:
FIG. 6 is a perspective view showing an operation state as seen from the rear side in FIG. 1.

FIG. 5 and FIG. 6 are diagrams showing the operation state of the controller 10 of the invention. The player holds the right grip 14R and left grip 14L by the right hand and left hand, respectively. At this time, the middle, ring and little fingers of the player are curved along the per-formed convex and concave parts, so that the player can hold the controller 10 firmly. The index fingers are positioned above the protrusions 17R, 17L formed in the upper parts of the grips 14R, 14L, and are used for manipulating the action instructing switches 16R, 16L. Usually, the index fingers rest on the protrusions 17R, 17L, and when manipulating the action instructing switches 16R, 16L, they are moved along the protrusions 17R, 17L. The thumbs are located on the key tops 15r, 15l while gripping the grips 14R, 14L, and press down the pressing parts by tilting in the desired input direction. As a result, the corresponding contact is connected, and a desired direction instructing signal (pulse signal) is picked up. By slightly shifting the right thumb to the inside, the action instructing switches 18A, 18B, 18C can be pressed.

Figure 7:
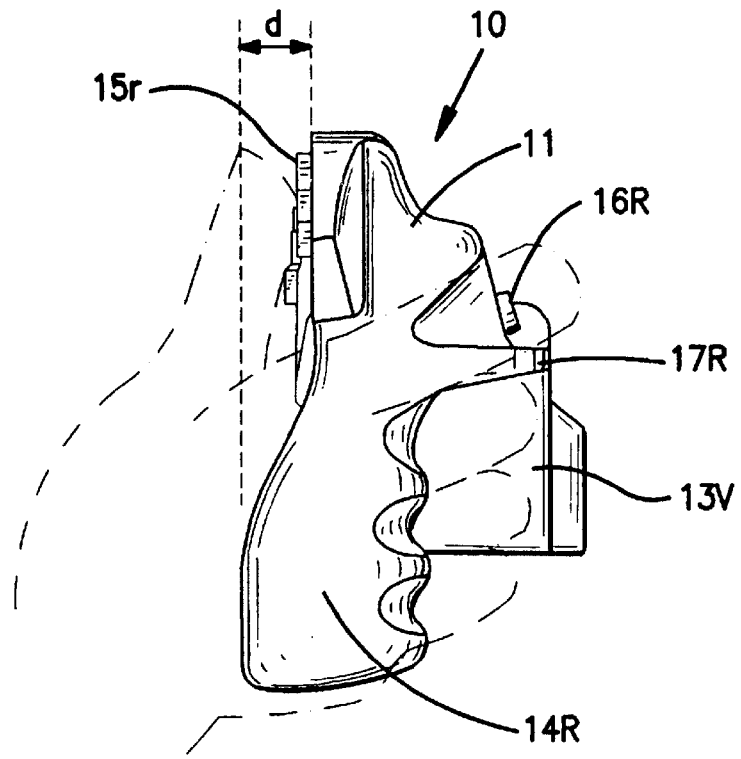
FIG. 7 is a diagram showing an operation state as seen from side in FIG. 1.

As shown in FIG. 7, in the controller 10 of the invention, since a step d is provided between the grip 14 and the operating region forming the direction instructing switch 15, when the player holds the controller 10, the thumb draws a spontaneous arc along the step d. Accordingly, the thumb is free to move, without being warped, loaded with an excessive force, or kept always in tense state, so that long term fatigue is reduced.

The interval or opening of the grips 14R, 14L may be freely adjustable depending on the individual difference of the player, by providing a shaft 20 penetrating from the surface of the right coupling 13R and left coupling 13L to the back of the power source unit 13V. Alternatively, relating to the right coupling 13R and left coupling 13L, a gear may be provided to engage the couplings, and the right and left sides may be opened or closed simultaneously, or the opening angle may be adjustable in multiple steps.

Figure 8:
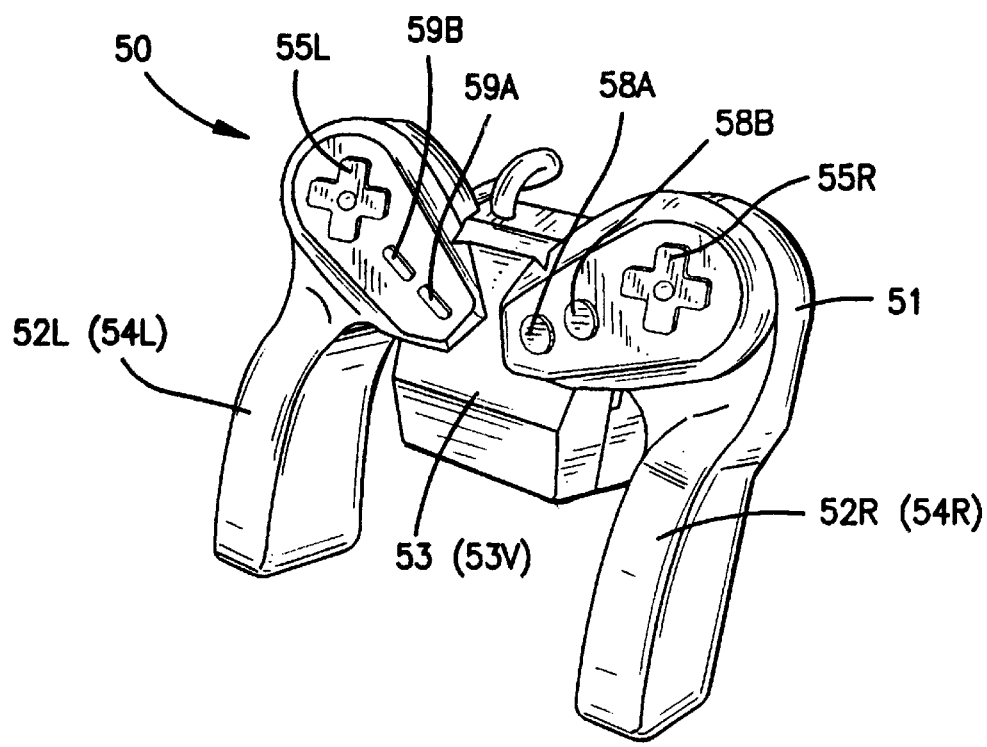
FIG. 8 is a front perspective view of a manipulator for game machine in other embodiment of the invention.
Figure 9:
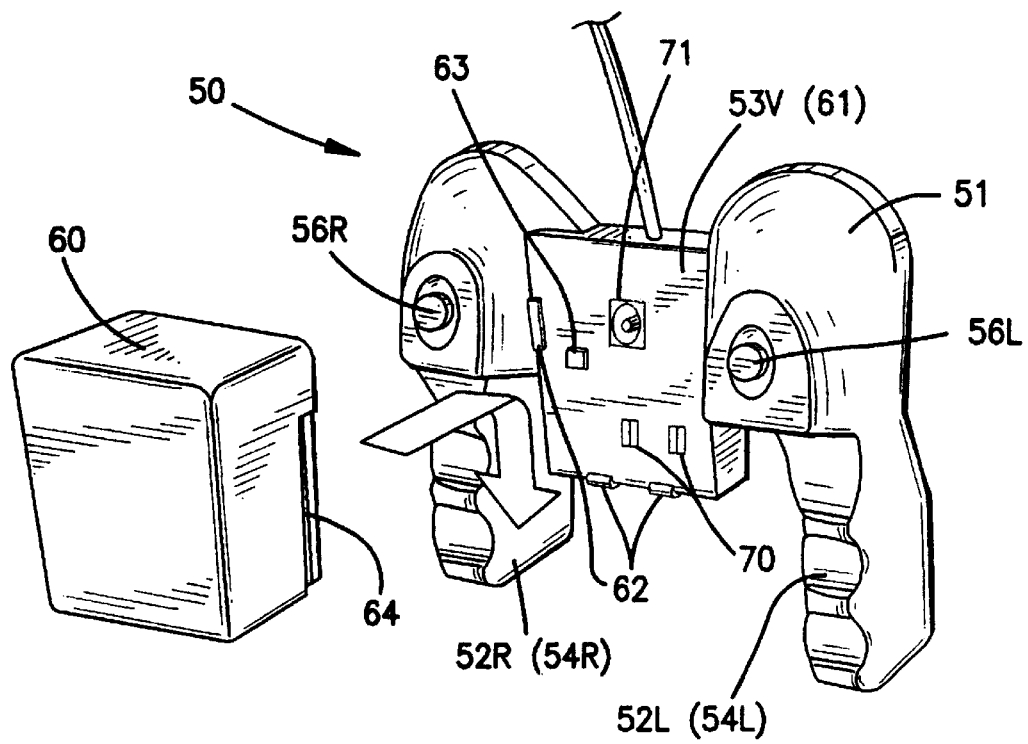
FIG. 9 is a rear perspective view of the embodiment in FIG. 8.

FIG. 8 and FIG. 9 are diagrams showing a manipulator for a game machine in another embodiment of the invention, and specifically FIG. 8 is a perspective view seen from the surface, and FIG. 9 is a perspective view seen from the back side.

A controller 50 in the embodiment in FIG. 8 comprises a housing 51, same as the controller 10 in the embodiment in FIG. 1. The housing 51 is roughly composed of a right handle 52R, a left handle 52L, and a coupling 53 for coupling the handle. Inside the housing 51 is accommodated a board in a proper shape (not shown) in which desired conductive circuit patterns are formed by printed wiring or the like.

The right handle 52R and left handle 52L respectively comprise grips 54R, 54L, direction instructing switch for right hand 55R, and direction instructing switch for left hand 55L. The direction instructing switches 55R and 55L are provided with cross key tops 55r, 55l.

The grips 54R, 54L have convex and concave parts to match with the fingers of the player, and action instructing switches 56R, 56L are formed in the index finger position areas of the player in the upper parts of the back side of the grips 54R, 54L. In the embodiment in FIG. 1, the index fingers are positioned by forming protrusions 17R, 17L in the boundary parts of the grips 14R, 14L and action instructing switches 16R, 16L, but in the embodiment in FIG. 8, the forming regions of the action instructing switches 56R, 56L are inclined by a certain angle to the grips 54R, 54L and direction instructing switches 55R, 55L, thereby defining the index fingers so as not to deviate in the direction toward the grips 54R, 54L, and the index fingers are further positioned by forming a recess around the action instructing switches 56R, 56L.

The coupling 53 comprises a power source unit 53V, a right coupling 53R, and a left coupling 53L. In the embodiment in FIG. 8, by widening the operating regions for forming the direction instructing switches 55R, 55L, they serve also as the right coupling 53R and left coupling 53L. The power source unit 53V comprises a power source case 60 detachable from the housing 51, and a base 61 of the housing 51 side for detaching or attaching the power source case 60. A dry cell or a rechargeable battery is placed in the power source case 60. In the base 61, an engaging pawl 62 and an engaging bump 63 are formed for engaging and holding the power source case 60. By contrast, at the power source case 60 side, an engaging groove 64 corresponding to the engaging pawl 62 and an engaging recess (not shown) to be engaged with the engaging bump 63 are formed.

A terminal 70 for electrically connecting with the power source case 60 is formed in the base 61, and a terminal 71 is provided for connecting the power cord when the power source case 60 is detached, so that the player may attach and use the power source case 60, or use the power cord by detaching it, as desired. When the power source case 60 is attached, the terminal 71 for power source cord is covered with the power source case 60 so as not to be exposed outside.

In the right coupling 53R, action instructing switches 58A, 58B for instructing actions different from the action instructing switches 56R, 56L are formed, and the left coupling 53L forms a start switch 59A and a select switch 59B. The direction instructing switches 55R, 55L, the action instructing switches 56R, 56L, 58A, 58B, start switch 59A and select switch 59B are composed of, same as in the embodiment in FIG. 1, key tops 53r, 53l, 56r, 56l, 58a, 58b, 59a, 59b, rubber contacts (not shown) formed in the lower part of each key top, and the board (not shown) on which rubber contacts are placed and contact circuits are formed.

Figure 10:
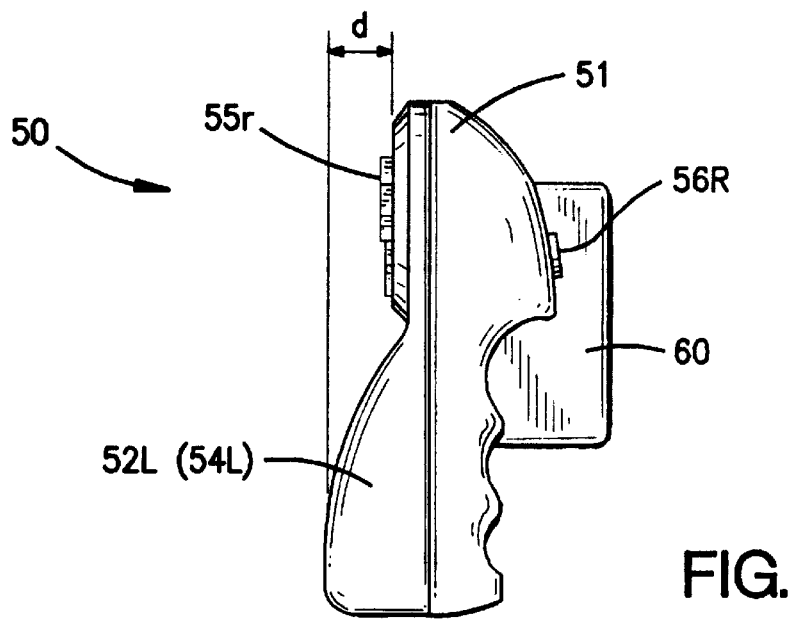
FIG. 10 is a side view of the embodiment in FIG. 8.

Moreover, as shown in FIG. 10, also in the embodiment in FIG. 8, a step d is formed between the grip 54 and the operating region for forming the direction instructing switch 55. Accordingly, when the player holds the controller 50, the thumb draws a spontaneous arc along the step d, and is free to move without being warped, applied with an excessive load, or kept always in a tense state, so that the fatigue is less if used for a long time.

In the foregoing embodiments of the invention, the move direction instructions in a three-dimensional game are mentioned, but in a game with two-dimensional direction instructions only (not requiring three-dimensional direction instructions), the moving direction of the object character may be instructed in one cross key, and the direction of the elements accompanying the character may be instructed in the other cross key. For example, in a game using soldiers as characters, the soldier moving direction is instructed by one cross key, and the firearm direction may be instructed by the other cross key. Furthermore, in an object driven independently in the right and left driving wheels such as a war tank, the left drive wheel may be manipulated by the direction instructing switch for left hand 15L (55L), and the right drive wheel may be manipulated by the direction instructing switch for right hand 15R (55R).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A controller for a game machine for use in a video game machine to which a cartridge storing a game program is attached, and which permits game play by reading out and executing the game program from the cartridge, comprising:

a first substantially bar shaped grip to be held by a hand of the player, said first grip including a step at an intermediate portion such that a surface facing the player is defined in first and second substantially parallel planes on opposite sides of said step;

a second substantially bar shaped grip to be held by the other hand of the player, said second grip including a step at an intermediate portion such that a surface facing the player is defined in said first and second substantially parallel planes on opposite sides of said step;

a first operating region located in the upper portion of the first grip and disposed in said second plane lower than said first plane;

a second operating region located in the upper portion of the second grip and disposed in said second plane lower than said first plane;

a first direction instructing member provided in the first operating region;

a second direction instructing member provided in the second operating region; and a coupling member for coupling the first grip and second grip in a confronting state.

2. A controller for a game machine of claim 1, wherein at least one of the first grip and second grip further comprises an action instructing member, in its upper portion, located at the index finger position of one hand of the player nearly at the rear position of at least one of the first operating region and second operating region.

3. A controller for a game machine of claim 2, wherein a protrusion for positioning the index finger of the player is formed near the action instructing member, in either the first grip or the second grip provided with the action instructing member.

4. A controller for a game machine of claim 1, wherein the first direction instructing member and second direction instructing member respectively contain four pressing pads, and by pressing the individual pressing pads, the first direction instructing member instructs the front, rear, left and right directions, the second direction instructing member instructs upper, lower, right slant and left slant directions, and thereby three-dimensional directions can be instructed.

5. A controller for a game machine of claim 2, wherein the action instructing member includes a first action instructing member formed in the first grip, and a second action instructing member formed in the second grip.

6. A controller for a game machine of claim 1, wherein the coupling member includes a third action instructing member formed within the accessible range of the thumb of one hand, in the state of the player holding both the first grip and the second grip.

7. A hand-held controller for a video game machine comprising:

a first handle having a front surface and a rear surface and configured to be gripped by one hand of a player;

a second handle having a front surface and a rear surface and configured to be gripped by the other hand of a player;

a first operating region disposed in a thumb area of a player gripping said first handle;

a first direction instructing member disposed in said first operating region for controlling movement of an object displayed in a video game played on the game machine;

a second operating region disposed in substantially the same plane as the first operating region;

a second direction instructing member disposed in said second operating region in substantially the same plane as the first direction instructing member for controlling movement of an object displayed in a video game played on the game machine; and at least one further control key disposed on a corresponding at least one of said first handle rear surface and said second handle rear surface, wherein at least one of said first handle rear surface and said second handle rear surface includes a surface that, in use, extends obliquely downward relative to a plane of said first and second handle front surfaces, and wherein said video game control key is disposed on the obliquely downward extending surface.

8. A hand-held controller according to claim 7, wherein said obliquely downward extending surface defines one side of a ridge disposed on the at least one of said first handle rear surface and said second handle rear surface, the other side of said ridge comprising a support surface positioned to support a player's middle finger in use.

* * * * *

UNITED STATES PATENT AND TRADEMARK OFFICE

CERTIFICATE OF CORRECTION

PATENT NO. : 5,820,462
DATED : October 13, 1998
INVENTOR(S) : YOKOI et al.

It is certified that error appears in the above-identified patent and that said letters patent is hereby corrected as shown below:

On the Title Page, Item [30], insert: --- May 22, 1994   [JP]   Japan..........6-12834. ----.

Signed and Sealed this

Third Day of April, 2001

*Attest:*

NICHOLAS P. GODICI

*Attesting Officer*     *Acting Director of the United States Patent and Trademark Office*